US010878518B2

(12) United States Patent
Povar et al.

(10) Patent No.: US 10,878,518 B2
(45) Date of Patent: Dec. 29, 2020

(54) BLOCKCHAIN ENABLED QUALITY CONTROL IN CONSTRUCTION PROJECTS

(71) Applicant: International Business Machines Corporation, Armonk, NY (US)

(72) Inventors: Victor Povar, Vancouver (CA); Craig M. Trim, Sylmar, CA (US); Sarbajit K. Rakshit, Kolkata (IN); Ahmed Nassar, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 15/967,580

(22) Filed: Apr. 30, 2018

(65) Prior Publication Data

US 2019/0333169 A1 Oct. 31, 2019

(51) Int. Cl.
*G06Q 50/08* (2012.01)
*G06Q 10/06* (2012.01)
*G06F 16/27* (2019.01)

(52) U.S. Cl.
CPC ............ *G06Q 50/08* (2013.01); *G06F 16/27* (2019.01); *G06Q 10/06395* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS 10,069,672 B2 * 9/2018 Curtis ...................... H04L 41/02
10,193,695 B1 * 1/2019 Endress ................. H04L 9/3239
2016/0098723 A1 * 4/2016 Feeney ................. G06Q 20/065
705/75
2017/0300946 A1 * 10/2017 Wilkinson .......... G06Q 30/0204
2018/0018590 A1 * 1/2018 Szeto ................... G06F 21/6254
2018/0094953 A1 * 4/2018 Colson ................... G06F 1/3287
2018/0123882 A1 * 5/2018 Anderson ............ H04L 41/0813
2018/0189528 A1 * 7/2018 Hanis ................... G06Q 10/087
(Continued)

FOREIGN PATENT DOCUMENTS

CN 106779737 A 5/2017

OTHER PUBLICATIONS

Biswas, Kamanashis, Vallipuram Muthukkumarasamy, and Wee Lum Tan. "Blockchain based wine supply chain traceability system." (2017): 56. (Year: 2017).*

(Continued)

*Primary Examiner* — Alan S Miller
(74) *Attorney, Agent, or Firm* — Garg Law Firm, PLLC; Rakesh Garg; James Nock

(57) ABSTRACT

A data item block is linked to a construction item block in a blockchain representing a construction project. A multi-dimensional tensor is constructed from a set of blocks in the blockchain, the set of blocks including the data item block, the construction item block, a block describing an operation relative to the construction item of the construction item block. An event is forecasted along a dimension of the tensor. The event is of the dimension, and is likely to occur relative to the construction item at a future time. A determination is made whether the event complies with a specification included in a spec block of the blockchain. When the event is non-compliant, an exception block corresponding to the event is linked with the construction item block in the blockchain.

25 Claims, 6 Drawing Sheets

(56) References Cited

U.S. PATENT DOCUMENTS

2018/0285996 A1* 10/2018 Ma .................. G06F 16/2428
2018/0315055 A1* 11/2018 Pickover ............. H04L 9/3297
2019/0259108 A1* 8/2019 Bongartz ............. G06Q 50/02

OTHER PUBLICATIONS https://www.merriam-webster.com/dictionary/blockchain; https://en.wikipedia.org/wiki/Blockchain.*
Aarni Heiskanen, A New Era of Construction Quality with IoT and Blockchain, AEC-Business, Jan. 2, 2017.
Abeyratne Saveen A et al., Blockchain Ready Manufacturing Supply Chain Using Distributed Ledger, International Journal of Research in Engineering and Technology, 05(09), 2016.
Provenance.org; Blockchain: The Solution for Transparency in Product Supply Chains, Nov. 21, 2015, Project Provenance Ltd.
Jun Wang et al., The Outlook of Blockchain Technology for Construction Engineering Management, Front. Eng (Frontier of Engineering) 2017, vol. 4, Issue (1):67-75, Mar. 31, 2017.

* cited by examiner

BLOCKCHAIN ENABLED QUALITY CONTROL IN CONSTRUCTION PROJECTS

TECHNICAL FIELD

The present invention relates generally to a method, system, and computer program product for managing brick and mortar construction projects. More particularly, the present invention relates to a method, system, and computer program product for blockchain enabled quality control in construction projects.

BACKGROUND

Construction projects contemplated herein include brick and mortar or cement-concrete type of construction projects, such as construction of houses, buildings, bridges, roads, and the like. The longevity of any item constructed as a construction work product depends on a large number of factors, e.g., how the quality of materials is maintained and measured during the construction project, the types and quantities of ingredients or proportions of the ingredients are used while constructing the item.

Improper mixing of the ingredients might result in poor quality of construction work product. For example, in constructing a bridge, the proportion of cement and sand is an important factor in determining the suitability of a construction item, such as of a column upon which the bridge rests. Improper mixing of the ingredients might cause defects in the column, the bridge, or both, or a useful life of the column or bridge might be less than an expected useful life.

Similarly, the sequence of operations employed in the construction project is another important factor. For example, while building a concrete pillar, the watering or curing time is very important. As an example, a poured concrete pillar might have to cure, with additional water applied, for a duration of x days to prevent internal cracks in the pillar. Many construction projects suffer from minor issues to catastrophic failures due to mismanagement of the factors affecting the project.

It is common for a construction project to involve several parties, each providing labor, materials, or services towards the completion of one or more construction items in the construction project. Commonly, suppliers, approving authorities, designers, construction workers, contractors, and engineers provide their respective products and services towards designated construction items of a project.

Tracking a construction project therefore becomes a significant task in itself, involving collection of data from the various entities. Often the data collection is dependent upon the willingness and/or the ability of a party to provide complete or accurate data. The decision-making based on the collected data is largely a human task, which is subject to errors. Collectively, the completeness of the collected data, the integrity of the collected data, the availability of the data for future audits, the propriety of the decisions made during the project, the availability for future audit of all the bases of the decisions, and many other such factors are all questionable under the present method of operating a construction project.

Even if reliable data is available at one point during the project, the continued availability of the data or the assurance against tampering or manipulation of the data is not guaranteed. In cases involving publicized failures of construction projects, it is all too common for the previously relied-upon data to become unavailable, unusable, and/or unreliable. Regardless of the success or failure of a construction project, post-facto audit of construction projects generally suffers from similar problems of unavailable, unusable, and/or unreliable data from the time of the construction.

During the construction project, operations that are being performs must comply with industry practices, project requirements, design specifications, and many other controls. Deviation of an operation from a norm, requirement, or specification must be caught in real-time to be able to take corrective actions. Presently, a party performing operations in a construction project is largely self-policing except for oversight at a coarse granularity. For example, fine granularity operations—such as whether the cement mixer has turned enough number of times to assure a proper mix—is largely a self-policed operation of a contractor. An overseeing engineer might only inspect the resulting construction item—e.g. a bridge column—which is a coarse granularity oversight because the pillar results from numerous fine granularity activities which go without scrutiny in such oversight.

Therefore, the illustrative embodiments recognize that a robust method is needed for performing quality control in a construction project. Such a method should operate in real-time to collect data points from the construction project site, analyze and associate the data points with specific construction items, and preserve the data points as well as the decisions based thereupon in an immutable and non-repudiable manner. Multiple parties should be able to contribute data to such a method in a tamper-proof manner, and supplemental systems should be able to make automatic decisions, notifications, and forecasts based on such contributed or collected data.

The illustrative embodiments recognize that the presently available tools or solutions for use in construction projects do not address these needs/problems or provide adequate solutions for these needs/problems. The illustrative embodiments used to describe the invention generally address and solve the above-described problems and other related problems by blockchain enabled quality control in construction projects.

Blockchain is a distributed method of managing a single immutable ledger of verified transactions. A blockchain ledger (interchangeably referred to hereinafter as "blockchain" or "ledger") is decentralized, i.e., no single central authority is in control of the ledger entries or updates, rather a network of authorized members share and verify the records—blocks—that are to be added to the ledger. Once added, a block is immutable, i.e., cannot be changed or deleted. Before a block is committed to the ledger, blockchain technology allows one or more verifications to be computed and applied to the block, and only upon a satisfactory number and/or types of verification can the block become a part of the ledger.

A block is uniquely identifiable in the ledger by an identifier associated with the block where the block identifier is unique within the ledger. Unless a block is last in a branch in the ledger, each block is connected to a previous block and a next block. Therefore, the blockchain allows verification of the history of a transaction recorded in a particular block by providing access to the previous and next blocks as far as needed up and down the ledger branches.

SUMMARY

The illustrative embodiments provide a method, system, and computer program product. An embodiment includes a method that links a data item block to a construction item block in a blockchain representing a construction project. The embodiment constructs a multi-dimensional tensor from a set of blocks in the blockchain, the set of blocks comprising the data item block, the construction item block, a block describing an operation relative to the construction item of the construction item block. The embodiment forecasts along a dimension of the tensor, an event of the dimension that is likely to occur relative to the construction item at a future time. The embodiment determines a compliance of the event with a specification included in a spec block of the blockchain. The embodiment links with the construction item block in the blockchain, an exception block corresponding to the event. Thus, the embodiment provides for substantially real-time quality control in a construction project by observing current operations relative to a construction item in the construction projects and forecasting a potential deviation based on the observations.

Another embodiment further computes a likelihood of compliance, of data included in the data item block, with a second specification in a second spec block in the blockchain, wherein the data is captured in substantially real-time, wherein the likelihood of compliance is further dependent upon a circumstantial factor existing at a time when the data was captured. The embodiment links with the construction item block in the blockchain, and responsive to the data being non-compliant, a second exception block corresponding to the data. The embodiment causes a corrective action to occur in the construction project relative to the construction item in substantially real-time. Thus, the embodiment detects compliance problems in an observed operation in substantially real-time and causes corrective operations in the construction project to effectuate quality control in substantially real-time.

In another embodiment, each block in the blockchain includes an identifier and wherein the identifier is unique within the blockchain. Thus, the embodiment provides for immutability and traceability in the construction project blockchain.

In another embodiment, data included in the data item block is captured from a source of a construction material that is used in the construction item. Thus, the embodiment provides for tracking of construction materials in the blockchain, where the tracking can begin at the source of the material, e.g., an inventory system of a contractor.

Another embodiment further captures data from a sensor monitoring the construction project, wherein the data item block comprises the data captured from the sensor. The embodiment analyzes the data to identify the construction item in the construction project, wherein the construction item block comprises a description of the construction item, and wherein the linking is responsive to the analyzing. Thus, the embodiment observes the construction site and associates materials and operations with specific construction items based on those real-time observations.

In another embodiment, the data is image data, wherein the sensor is a camera device, wherein the analyzing comprises image analysis to extract an image component, and wherein the image component is indicative of the construction item. Thus, the embodiment provides capturing real-time materials movement, operations performance, and association with construction items through image-based real-time observations.

Another embodiment further captures data from a sensor monitoring the construction project, wherein the data item block comprises the data captured from the sensor, and wherein the data comprises a measurement of a material used in the construction project. Thus, the embodiment provides capturing real-time materials movement, operations performance, and association with construction items through a variety of sensors capable of collecting and transmitting a variety of measurements in real-time.

In another embodiment, the data further comprises information usable to identify a construction item, and wherein the linking uses the information to identify the construction item block. Thus, the embodiment uses the sensor data to identify the specific construction item to which the measurement relates.

In another embodiment, the data item block comprises data captured at a first time, the set of blocks further comprising a second data item block, wherein the second data item block comprises data captured at a second time prior to the first time. Thus, the embodiment uses current as well as historical blocks in the blockchain to forecast events relative to a construction item at a construction project.

In another embodiment, the set of blocks further comprises a block including an identification and measurement of a construction material. Thus, from the real-time observed data, the embodiment identifies the specific type and quantity of the material being moved or applied to the construction item.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
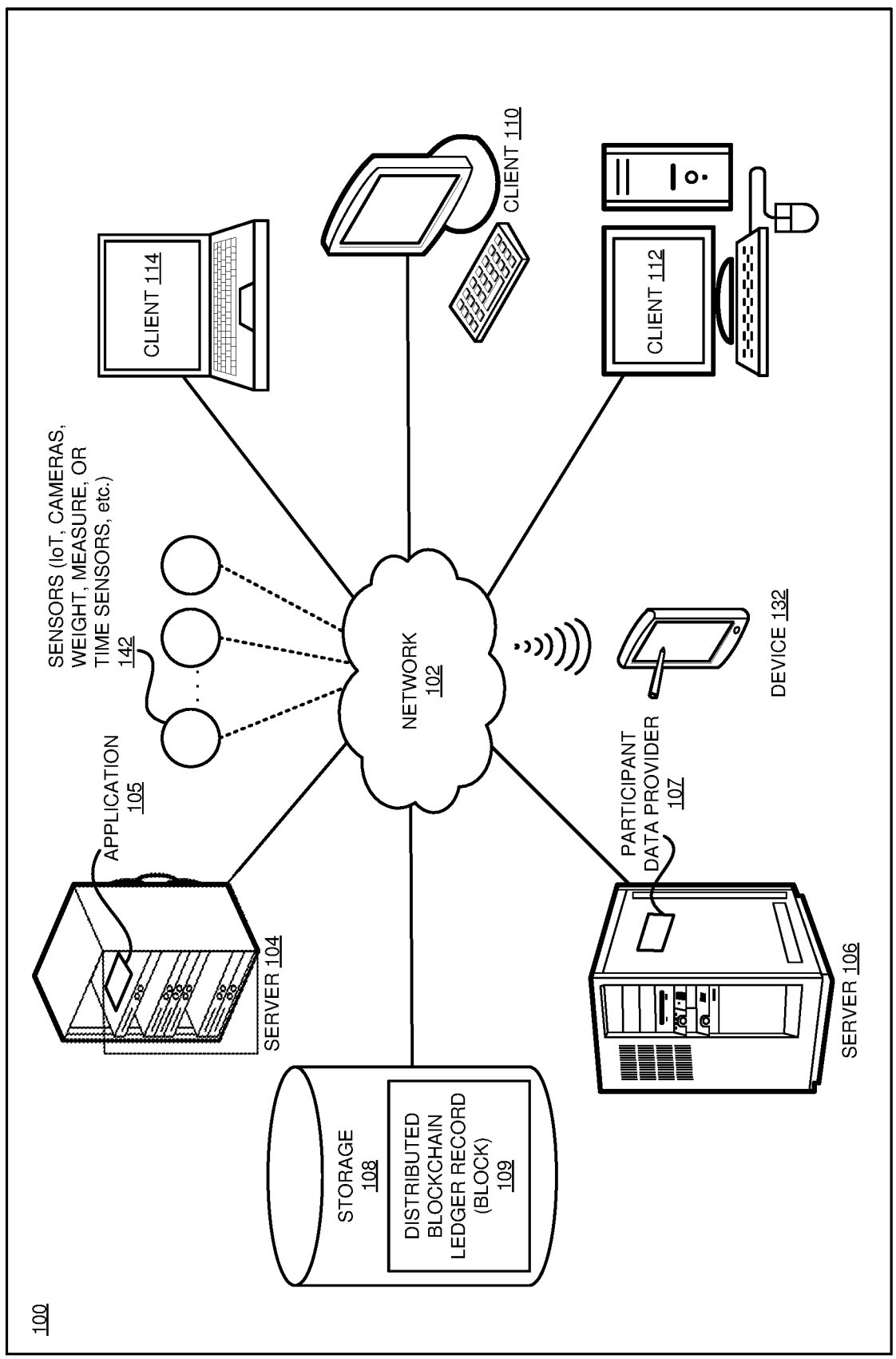
FIG. 1 depicts a block diagram of a network of data processing systems in which illustrative embodiments may be implemented.

Construction project management using computer software and hardware is a well-recognized technological field of endeavor. The present state of the technology in this field of endeavor has certain drawbacks and limitations with respect to quality control in construction projects. The operations of the illustrative embodiments impart additional or new capabilities to improve the existing technology in the technological field of endeavor of construction project management, especially in the area of quality control by providing a technological solution that reduces or eliminates the possibility of previously relied-upon data becoming unavailable, unusable, and/or unreliable, real-time detection of materials or operational deviations at a fine granularity of operations in a construction project.

An embodiment can be implemented as a combination of certain hardware components and a software application. An implementation of an embodiment, or one or more components thereof, can be configured as a modification of an existing construction project management system, with a companion software application executing in some combination of (i) the project management system itself, (ii) a data processing system communicating with the project management system over short-range radio or a local area network (LAN), and (iii) a data processing system communicating with the project management system over a wide area network (WAN).

An embodiment employs a variety of sensors and devices to capture real-time data points from the site of the construction project. For example, Internet of Things (IoT) enables devices deployed in construction machines, materials storage, pathways connecting to the site or a particular construction item at the construction site, and other locations can sense motion or lack thereof, changes in weight or humidity, elapsed time during a motion or lack thereof, force applied, distance traveled, speed or velocity, and many other data points in real-time. Other types of embedded sensors can also collect and transmit similar data.

Similarly, imaging devices such as fixed or movable platform mounted cameras can also capture and transmit a variety of real-time data points in the form of images or vide. For example, cameras can capture images of materials, locations, sites, construction items, positions of machinery, presence or count of types of equipment or units of materials, and many other data points in real-time.

A variety of data processing systems can also be used to collect real-time data points. For example, a supply-chain database that manages materials inventory is capable of providing real-time data on quantities, types, brands, and compositions of materials being withdrawn.

Using a blockchain management system, an embodiment constructs a blockchain record from a data point input obtained from any of the sources described herein. The embodiment identifies a construction item at the construction site to which the data point relates. For example, using image data from a camera, one embodiment analyzes the image to identify a structural component of the construction. Using image recognition techniques, and the location information from the image or another source, the embodiment identifies the structural component as a particular construction item located a particular location at the construction site. The image analysis can be performed using, but is not limited to such use, a construction drawing in conjunction with the image to locate and identify the construction item on the ground.

The embodiment associates the blockchain record (block) containing the data point information with a blockchain of the construction item. In other words, the embodiment arranges the block of the data point and the block of the construction item in such a way that the data item block is reachable from the construction item block, and vice versa, in the given blockchain ledger.

The data items are real-time and time-bound (ignoring technological delays in capturing, transmitting, and processing the data item), i.e., associated with a time at which they occurred. Because the data item blocks are time-bound, the blockchain traversal from the construction item to the data item block (or vice versa) provides a reliable, immutable, history of an occurrence at a specific time at or relative to the construction item. Furthermore, the blockchain also relates each construction item block to the construction project. The blockchain thus enables an immutable chronological record of various occurrences at various construction items within the construction projects.

An embodiment also collects one or more requirements documents, specifications, procedures, regulations, or guidelines (collectively referred to herein as "specs") associated with the construction project as a whole, or specific to a particular construction item. A block corresponding to a spec is also linked to the block corresponding to the construction item to which the spec applies.

Similarly, through the data items collected from a variety of sensors, including but not limited to IoT devices and cameras, an embodiment infers an operation. For example, if a cement mixer is turning with greater than a certain weight, a cognitive analysis of the various data items enables the embodiment to draw an inference with a greater than a threshold confidence that a concrete mixing operation is underway. Similarly, data items indicating checking out a quantity of cement prior to the mixing, the mixing, and the positioning of a concrete pump at a location in some sequence can indicate a concrete pouring sequence of operations. Each operation in a sequence computed with associated confidence in this manner is stored in a block in the blockchain as well.

An embodiment uses the contents of the specs blocks, the contents of the operations blocks, and the contents of the data item blocks in cognitive analysis for decision-making. A non-limiting example of the types of decisions made by the cognitive analysis includes, determining whether a weight or measurement of cement mixed with a weight or measurement of water complies with a cement-water ratio specified in a spec. One or more data item blocks provide the measurement of cement, one or more data item blocks provide the measurement of water, and one or more spec blocks provide the specified ratio. For example, a weight sensing IoT device in the mixer provides the weight data item of solids added to the mixer, a camera image data item verifies that the solids being added is cement, a flow data item from a flow meter IoT device verifies a volume of water flowing into the mixer. A location data item from an image or a location sensing device of the mixer identifies an intended use of the mix at the location. A spec item from a construction drawing identifies the construction item at or proximate to the location for which the mix is intended. An engineering specification spec item corresponding to the construction item provides a requisite ratio.

The embodiment processes this available from various blocks in the ledger using a cognitive engine. The cognitive engine determines whether the actual mix being prepared complies with the specified ratio under the circumstances, e.g., given the weather, atmospheric humidity, precipitation forecast, ambient temperature, and the like. If the mix deviates more than a tolerance value from the spec under the circumstances in real-time at the time the data items are collected, the decision-making component of the embodiment generates an exception notification and creates a block containing exception data for the blockchain. A person or system can then take appropriate corrective action in real-time, while the blockchain immutably preserves the exception for all future uses.

Similarly, if the mixing has been performed, and the mixer is stopped with the pump truck connected, an embodiment forecasts a future operation using a forecasting engine. For example, the future operation in a known sequence following the mixing, stopping the mixing, and connecting the pump truck would be to pour the concrete into a cast. Accordingly, the embodiment determines that the next operation would be the pouring. A deviation from the forecasted operation can also give rise to an exception. For example, if more than a threshold time elapses between the stopping the mixing and beginning the pouring, the mix may no longer be acceptable for pouring and the next forecasted operation of pouring should not commence. Accordingly, the embodiment raises an exception, records the exception in the blockchain, and causes a corrective action to be taken in real-time.

As another example, suppose that the embodiment determines that the mixing duration in the sequence is less than a specified duration, but mixing has stopped, and the pump truck is being connected according to the data items being generated by various sensors and devices. The embodiment can again raise an exception to cause a corrective action in real-time, e.g., stop the insufficiently mixed concrete to be poured. Again, the exception is recorded in the blockchain for all future uses, including but not limited to a performance audit of the contractor.

The forecasting by an embodiment is not limited to the immediate next operations. The blocks of the blockchain are usable to form a tensor in any number of dimensions. For example, a tensor may have a time dimension along which operations, movements, material handling, and other events occur at or related to the construction site; a materials dimension along which changes in materials quantities or quality occur; an operations dimension along which operations or sequence of operations occur. An embodiment can forecast events along any dimension or axis of a tensor formed from the information contained in the blocks of the blockchain.

These examples of events, movements, materials, operations, sequences, forecasts, exceptions, circumstances, or construction items are not intended to be limiting. From this disclosure, those of ordinary skill in the art will be able to conceive many other situations in a construction projects for which an embodiment can be adapted or used in a similar manner, and the same are contemplated within the scope of the illustrative embodiments.

The manner of blockchain enabled quality control in construction projects described herein is unavailable in the presently available methods in the technological field of endeavor pertaining to construction project management. A method of an embodiment described herein, when implemented to execute on a device or data processing system, comprises substantial advancement of the functionality of that device or data processing system in improving real-time quality control and immutable record keeping in construction projects.

The illustrative embodiments are described with respect to certain types of data items, specs, operations, construction projects, construction items, cognitive analysis, forecasts, conditions, exceptions, sensors, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
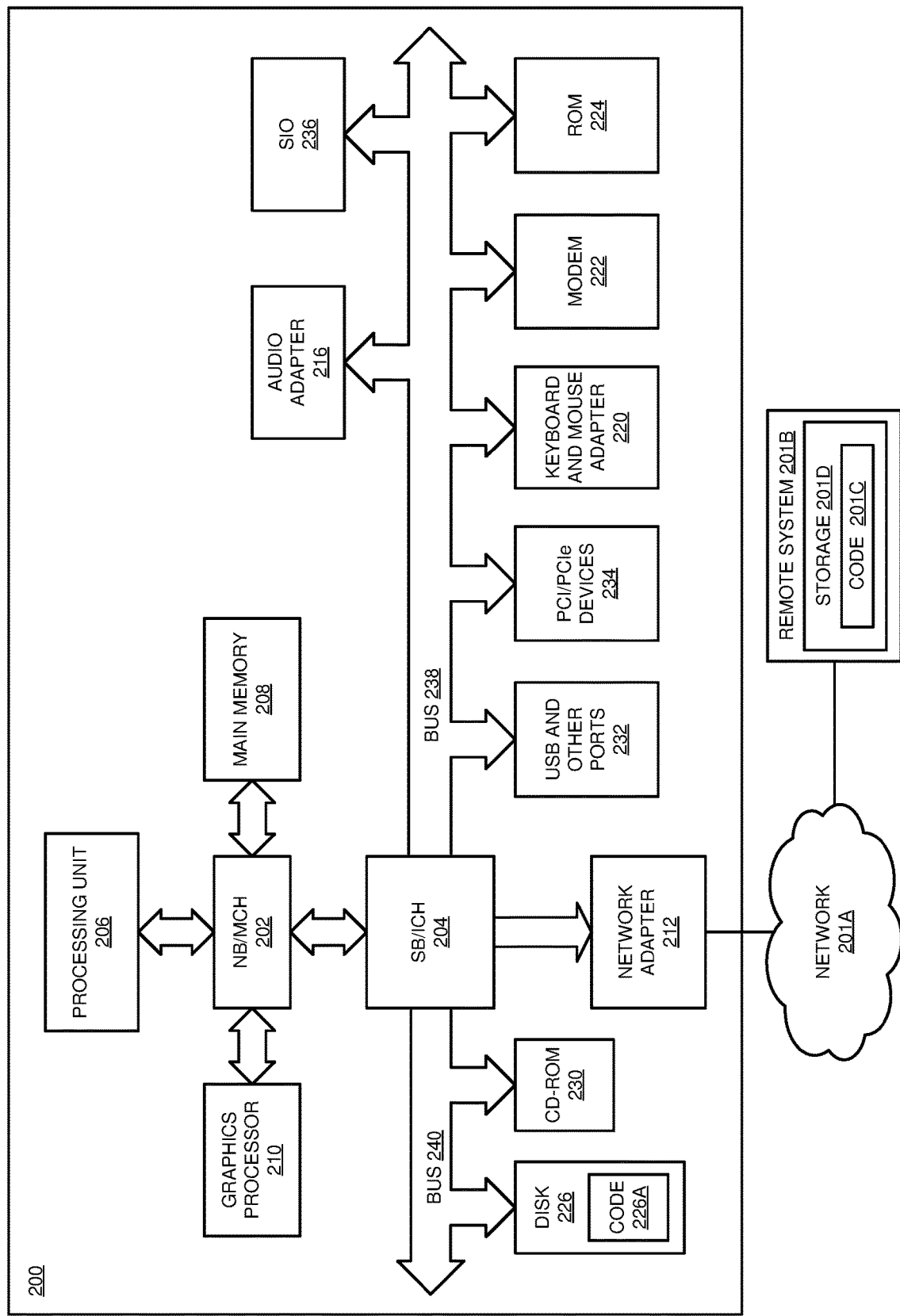
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Record 109 is a block in a distributed blockchain that is constructed or validated by application 105 as described herein. Data provider 107 is a system of a participant in a construction project, such as an inventory database of a contractor, a design database of an engineer, a regulations repository of a regulatory body, a construction specification of a customer. Sensors 142 are a collection of a variety of sensors as described herein, including but not limited to IoT sensors for measurement data items such as weights, sizes, quantities, or duration, and cameras for capturing image or video data items. Other systems, such as a cognitive analysis engine, an image analysis engine, a forecasting model are also operational in one or more data processing systems in environment 100 but are not shown for the clarity of the depiction. Such other systems are used by application 105 as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
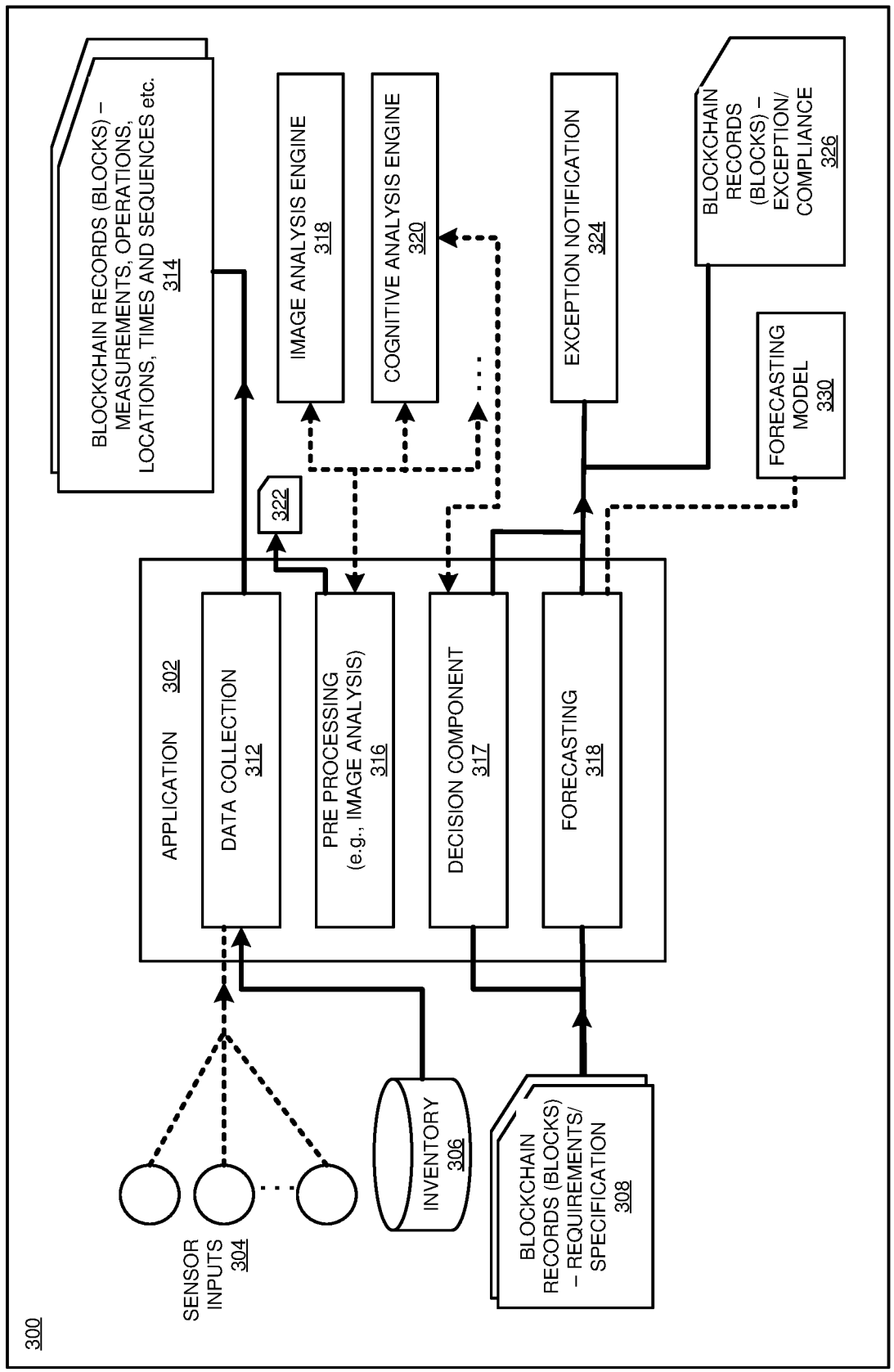
FIG. 3 depicts a block diagram of an example configuration for blockchain enabled quality control in construction projects in accordance with an illustrative embodiment.

With reference to FIG. 3, this figure depicts a block diagram of an example configuration for blockchain enabled quality control in construction projects in accordance with an illustrative embodiment. Application 302 is an example of application 105 in FIG. 1. Sensor inputs 304 are one or more real-time data items communicated from one or more sensors or devices in a manner described herein. Inventory 306 and other systems also provide data items in a manner described herein. Blocks 308 are formed separately by application 302 as and when the underlying documents become available to application 302.

Component 312 collects the data items 304 and 306 transmitted or published by a variety of sources. Component 312 produces blocks 314 from data items 304 and 306. Preferably, a separate block is constructed and inserted into a blockchain for each data item, such as for each measurement, location, time, and other types of data items described herein.

Some collected data may require pre-processing for data item extraction. For example, if a data item is an image or a video, component 316 uses image analysis engine 318 to extract image features, such as construction items, types of operations being performed, materials being used, and many other image features that will be conceivable from this disclosure by those of ordinary skill in the art. Component 316 may further use cognitive analysis engine 320 to distinguish between possible construction items, types of operations being performed, materials being used, and many other image features which may be subject to multiple interpretations, or for which multiple instances may be possible at the construction site. For example, if the image analysis reveals a construction item that is a pillar, the cognitive analysis may analyze the construction drawing, a phase of construction during which the pillar is being constructed, a location at which the pillar is being constructed and may determine that the pillar is pillar ABC123 in the construction drawing. Alternatively, the cognitive analysis may determine that the construction item is in fact a pillar but is a temporary support pillar which will be removed later. This type of differentiation and other cognitive analyses from cognitive analysis engine 320 help component 316 make the correct decision with respect to the construction item, operation, operation sequence, materials, quantities, and other considerations.

Suppose that component 316 determines that an image data item reveals a specific construction item, e.g., a pillar. Component 316 creates block 322 for the detected construction item. Blocks 314, described earlier, are then linked to block 322 in the blockchain.

Component 316 uses cognitive analysis engine 320 to determine compliance of the contents of the collected data items. For example, given spec blocks 308 and data item block 314, cognitive analysis engine 320 determines whether a content of a data item block 314 is within a tolerance of a content of a spec block 308 while considering other inputs to cognitive engine 320, such as present weather, temperature, operating conditions, and the like. Cognitive analysis engine 320 provides a conclusion with an associated confidence.

Decision component 317 determines whether the conclusion and the confidence outputs provided by cognitive analysis engine 320 qualify as a deviation from an expectation. For example, the conclusion may be that the mix ratio of cement, sand, and water should be 2:2:3 according to a spec block 308 but is observed from data item blocks 314 as being 2:3:3, which is an improper mix given the environmental and operational inputs, with a confidence of 80 percent. Decision component 317 may determine that the mix ratio deviation is unacceptable and triggers exception notification 324. Decision component 317 also constructs block 326 indicating the exception and containing the exception data, e.g., the improper mix ratios. Exception block 326 is linked in the blockchain with data item blocks 314 and spec blocks 308 that led to the decision. Existing links from such data item blocks 314 and spec blocks 308 to specific construction item block 322 thus link exception block 326 with the specific construction item block 322.

As another example, a spec block 308 might be directed to sequence of operations and provide that a curing operation must be performed after x hours of pouring concrete in a cast. A data item identifies that the curing operation has not been performed after x hours of a particular pouring of a particular construction item. Cognitive analysis engine 320 concludes that omitting the curing operation from the sequence is a deviation but not improper given that 4 inches of precipitation has occurred within the x hours, with a confidence of 90 percent. Decision component 317 may determine that the deviation from the prescribed operations sequence is acceptable and triggers compliance notification 324. Decision component 317 also constructs block 326 indicating the compliance and containing the compliance data, e.g., the precipitation data (a data item block 314 can be constructed for the precipitation data). Compliance block 326 is linked in the blockchain with data item blocks 314 and spec blocks 308 that led to the decision. Links from such data item blocks 314 and spec blocks 308 to specific construction item block 322 thus link compliance block 326 with the specific construction item block 322.

Forecasting component 328 uses forecasting model 330 to forecast a future exception or compliance condition. Forecasting component 328 provides forecasting model 330 an input comprising the current real-time data items in blocks 314, past data items from blocks 314, spec blocks 308, past or current exception or compliance blocks 326, or some combination thereof. The forecast can be along any tensor dimension represented by the contents of the input blocks. Forecasting model 330 provides a forecast with a confidence value. Forecasting component 328 determines whether the forecast and confidence output of forecast model 330 justifies exception (or compliance) notification 324 and corresponding exception (or compliance) block 326 for a possibility of a future exception (or compliance).

Figure 4:
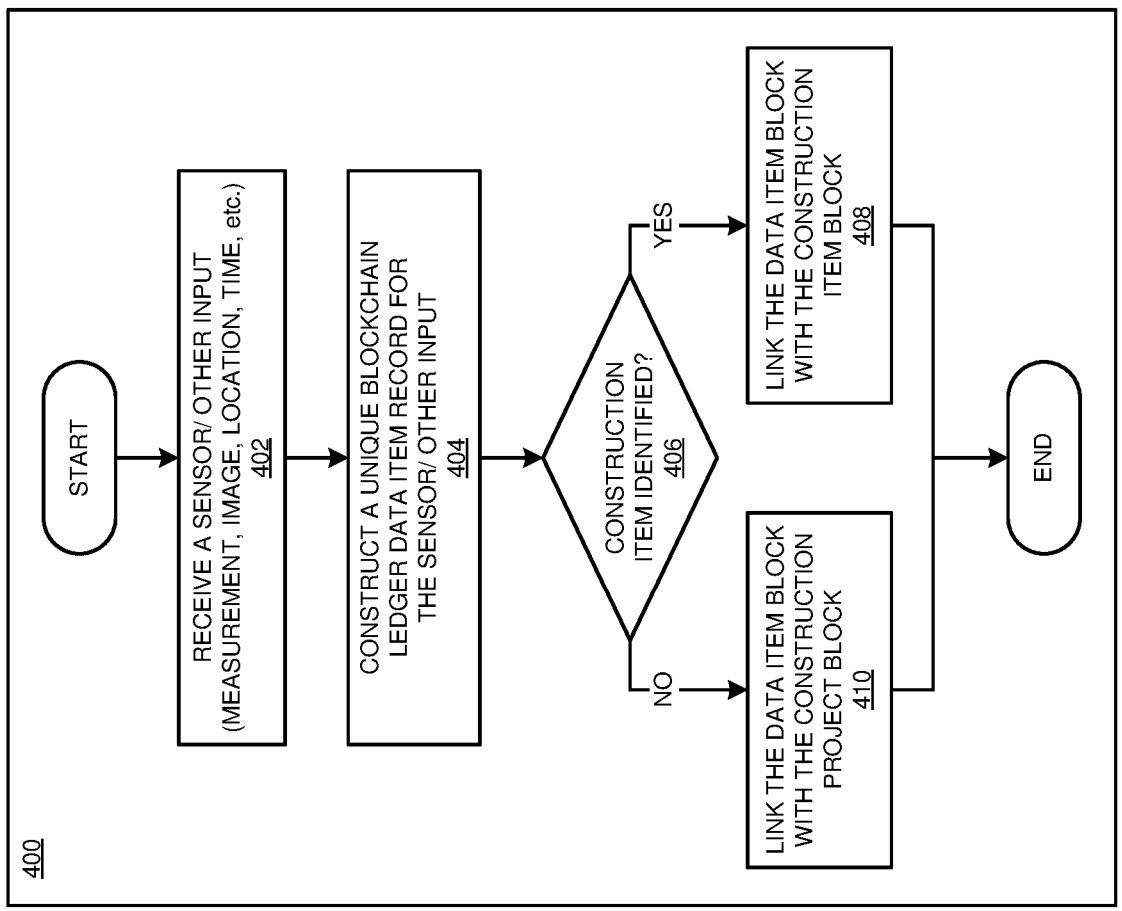
FIG. 4 depicts a flowchart of an example process for populating real-time data item blocks in a construction project blockchain in accordance with an illustrative embodiment.

With reference to FIG. 4, this figure depicts a flowchart of an example process for populating real-time data item blocks in a construction project blockchain in accordance with an illustrative embodiment. Application 302 can construct data item block 314 of FIG. 3 using process 400.

The application receives a sensor input or an input from another system as a real-time data item (block 402). The application constructs a block containing the as-received (raw) or pre-processed contents of the data item such that the data item block is uniquely identifiable in a construction project blockchain (block 404).

The application determines whether a construction item related to the data item has been identified (block 406). If the construction item has been identified ("Yes" path of block 406), the application links the data item block with the block corresponding to the construction item (block 408). If the construction item has not yet been identified ("No" path of block 406), the application links the data item block with the block corresponding to the construction project in the construction project blockchain (block 410). The application ends process 400 thereafter.

Figure 5:
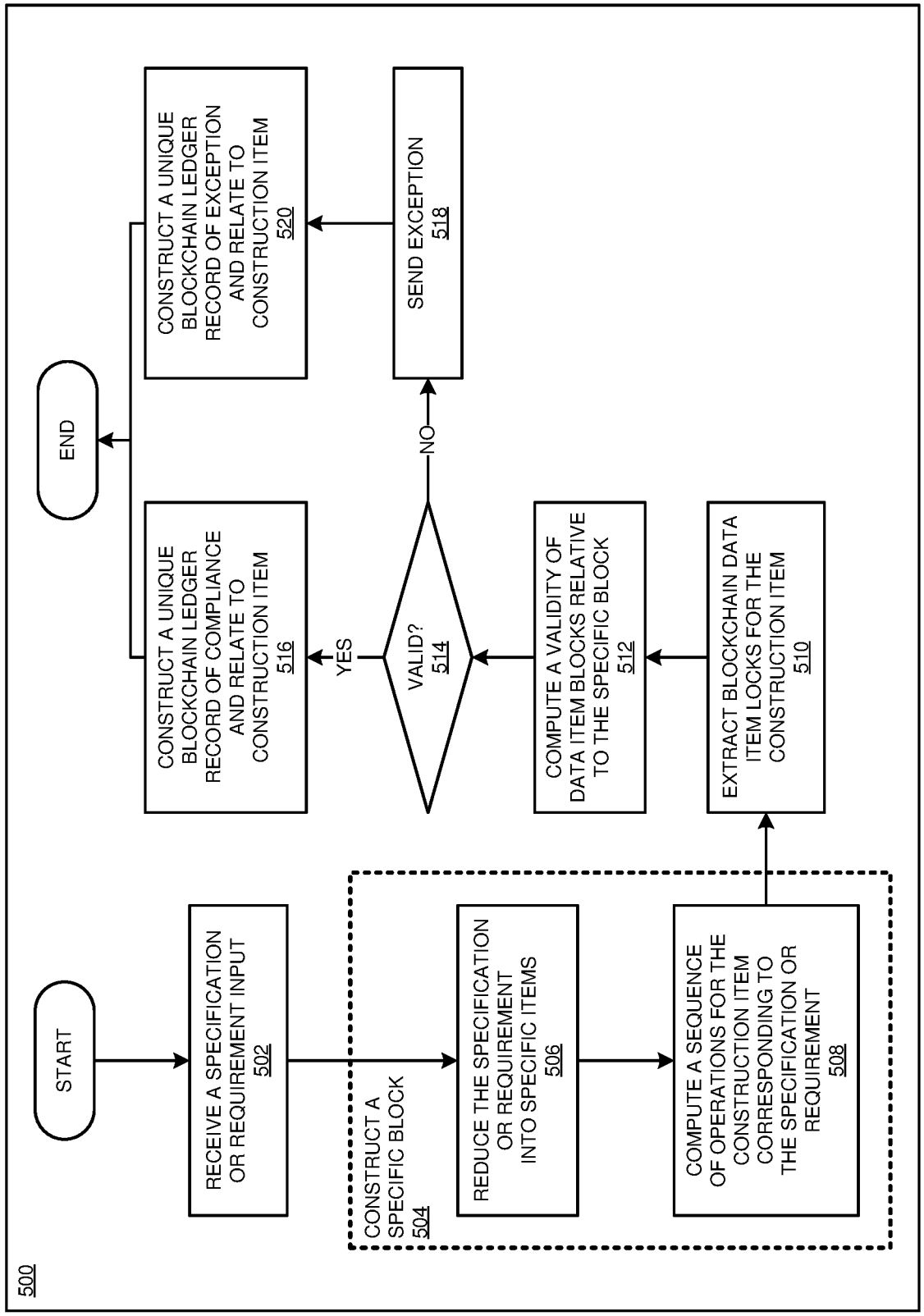
FIG. 5 depicts a flowchart of an example process for entering exception or compliance blocks in a construction project blockchain in accordance with an illustrative embodiment.

With reference to FIG. 5, this figure depicts a flowchart of an example process for entering exception or compliance blocks in a construction project blockchain in accordance with an illustrative embodiment. Application 302 uses process 500 to construct blocks 326 in FIG. 3.

The application receives a spec as an input (block 502). For example, the application receives a specification or a requirements document, or other spec documents as described herein. The application constructs a spec block for insertion into the construction project blockchain (block 504).

For example, in the process of constructing the spec block, the application reduces, or decomposes the spec into a constituent spec item, e.g., a design of a pillar structure (block 506). The application computes—using construction domain knowledge, regulations, industry practices, the spec itself, and other means—a sequence of operations for a construction item that should be constructed according to the spec item (block 508). The sequence of operations can be included in the spec block, or a separate spec item block linked to the spec block in the construction project blockchain.

For an identified construction item, e.g., from image analysis of an image input, the application reads from the blockchain the corresponding data item blocks (block 510). The application computes a validity of a data item from the data item block relative to the spec block (block 512). For example, the validity check at block 512 computes whether a measurement of material required to comply with the spec of the spec item is indicated by the data item, or an operation indicated by the data item is an appropriate operation in an appropriate sequence relative to the construction item according to the spec. These and other validity determinations are performed by the application in a manner described herein.

If the data item exhibits validity relative to the spec for the construction item ("Yes" path of block 514), the application constructs a compliance block and links the compliance block to the construction item block in the construction project blockchain (block 516). The application ends process 500 thereafter.

If the data item exhibits invalidity relative to the spec for the construction item ("No" path of block 514), the application sends a notification about the exception (block 518). The application constructs an exception block and links the exception block to the construction item block in the construction project blockchain (block 520). The application ends process 500 thereafter.

Figure 6:
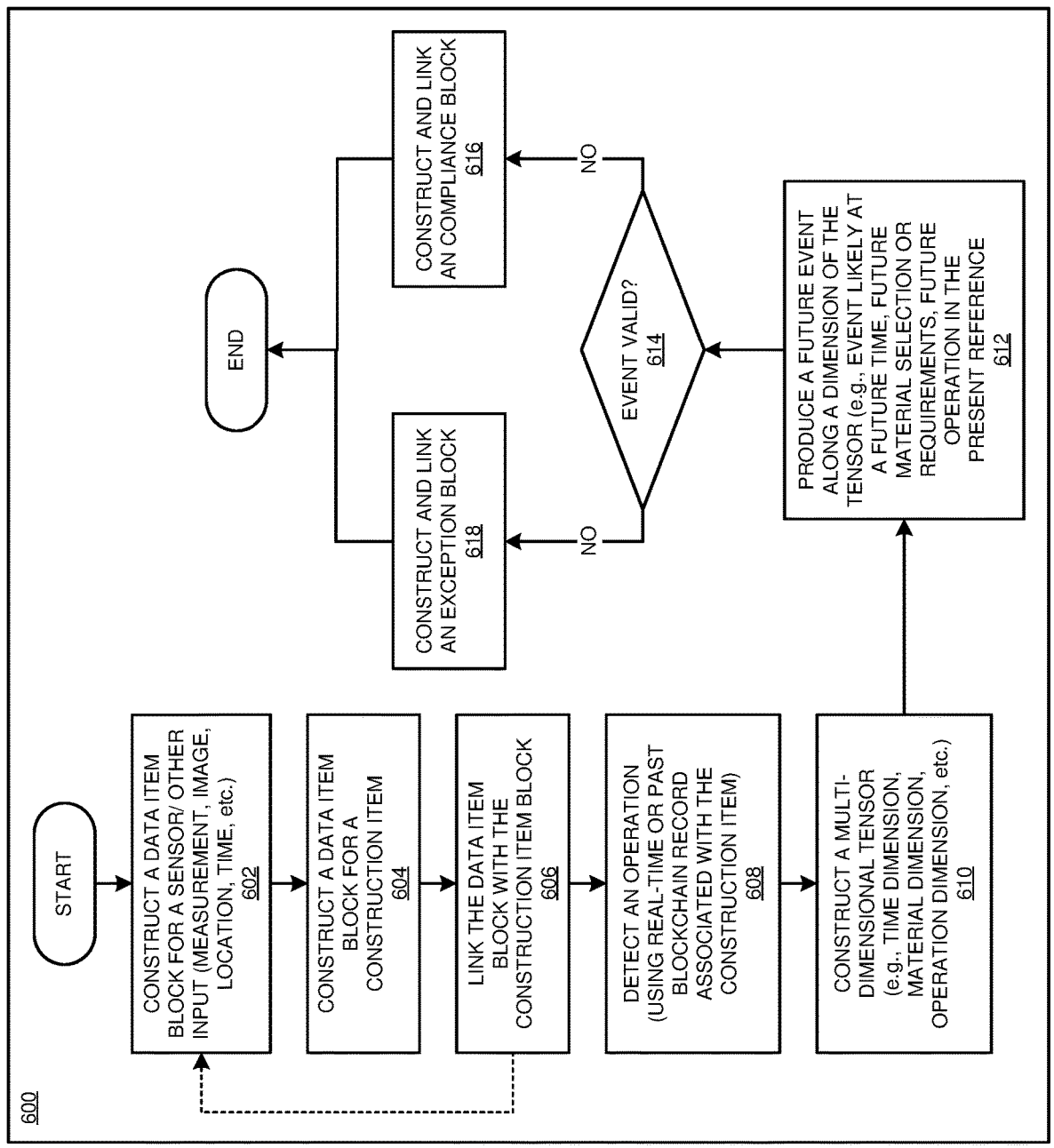
FIG. 6 depicts a flowchart of an example process for forecasting construction project exceptions using a construction project blockchain in accordance with an illustrative embodiment.

With reference to FIG. 6, this figure depicts a flowchart of an example process for forecasting construction project exceptions using a construction project blockchain in accordance with an illustrative embodiment. Application 302 in FIG. 3 uses process 600 to produce forecasted exception block 326.

The application receives a variety of data item inputs and constructs data item blocks corresponding to the data items (block 602). The application identifies a construction item and constructs a construction item block corresponding to the construction item (block 604). The application links a data item block with the construction item block (block 606). Blocks 602-606 repeat depending on a number of data items received corresponding to a number of construction items.

Using one or more blocks from the construction project blockchain, the application computes an operation that is either occurring or failing to occur relative to the construction item at a given time (block 608). The application constructs a multidimensional tensor using real-time and/or past data item blocks from the blockchain (block 610). For example, the tensor may include time-related data points along a timeline, materials or material changes along a materials dimension, operations or change in operations along an operations dimension.

The application uses a forecasting model adapted to the construction project domain to forecast a future event along a dimension of the tensor (block 612). For example, the event may be likely to be mistimed at a future time along the timeline, the event may be a likely material selection or availability at the future time, or the event may be a future operation likely to occur or not occur at the future time.

The application determines whether the forecasted event would be valid or appropriate for the construction item, in the present sequence of operations, at the future time (block 614). If the event would be valid ("Yes" path of block 614), the application optionally creates and links a compliance block in the blockchain (block 616). The compliance block indicates the forecasted compliance or validity of the forecasted event. The application ends process 600 thereafter.

If the event would be invalid ("No" path of block 614), the application creates and links an exception block in the blockchain (block 618). The exception block indicates the forecasted exception or invalidity of the forecasted event. The application ends process 600 thereafter.

Thus, a computer implemented method, system or apparatus, and computer program product are provided in the illustrative embodiments for blockchain enabled quality control in construction projects and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   linking a data item block to a construction item block in a blockchain representing a construction project, wherein the linking comprises using a cognitive analysis engine to identify a construction item from a data item in the data item block;
   constructing a multi-dimensional tensor from a set of blocks in the blockchain, the set of blocks comprising the data item block, the construction item block, a block describing an operation relative to the construction item of the construction item block;
   forecasting along a dimension of the tensor, an event of the dimension that is likely to occur relative to the construction item at a future time;
   determining a non-compliance of the event with a specification included in a spec block of the blockchain, wherein the determining comprises detecting, using the cognitive analysis engine, that a content of the data item block indicates that the construction item is not within a tolerance value identified using the specification; and
   linking an exception block corresponding to the event with the construction item block in the blockchain, wherein the exception block includes an exception that causes another system to take corrective action to prevent use of the construction item in the construction project.

2. The method of claim 1, further comprising:
   computing a likelihood of compliance, of data included in the data item block, with a second specification in a second spec block in the blockchain, wherein the data is captured in substantially real-time, wherein the likelihood of compliance is further dependent upon a circumstantial factor existing at a time when the data was captured; and
   linking with the construction item block in the blockchain, and responsive to the data being non-compliant, a second exception block corresponding to the data; and
   causing a corrective action to occur in the construction project relative to the construction item in substantially real-time.

3. The method of claim 1, wherein each block in the blockchain includes an identifier and wherein the identifier is unique within the blockchain.

4. The method of claim 1, wherein data included in the data item block is captured from a source of a construction material that is used in the construction item.

5. The method of claim 1, further comprising:
   capturing data from a sensor monitoring the construction project, wherein the data item block comprises the data captured from the sensor; and
   analyzing the data to identify the construction item in the construction project, wherein the construction item block comprises a description of the construction item, and wherein the linking is responsive to the analyzing.

6. The method of claim 5, wherein the data is image data, wherein the sensor is a camera device, wherein the analyzing comprises image analysis to extract an image component, and wherein the image component is indicative of the construction item.

7. The method of claim 1, further comprising:
capturing data from a sensor monitoring the construction project, wherein the data item block comprises the data captured from the sensor, and wherein the data comprises a measurement of a material used in the construction project.

8. The method of claim 7, wherein the data further comprises information usable to identify a construction item, and wherein the linking uses the information to identify the construction item block.

9. The method of claim 1, wherein the data item block comprises data captured at a first time, the set of blocks further comprising a second data item block, wherein the second data item block comprises data captured at a second time prior to the first time.

10. The method of claim 1, wherein the set of blocks further comprises a block including an identification and measurement of a construction material.

11. A computer usable program product comprising a computer-readable storage device, and program instructions stored on the storage device, the stored program instructions comprising:
program instructions to link a data item block to a construction item block in a blockchain representing a construction project, wherein the linking comprises using a cognitive analysis engine to identify a construction item from a data item in the data item block;
program instructions to construct a multi-dimensional tensor from a set of blocks in the blockchain, the set of blocks comprising the data item block, the construction item block, a block describing an operation relative to the construction item of the construction item block;
program instructions to forecast along a dimension of the tensor, an event of the dimension that is likely to occur relative to the construction item at a future time;
program instructions to determine a non-compliance of the event with a specification included in a spec block of the blockchain, wherein the determining comprises detecting, using the cognitive analysis engine, that a content of the data item block indicates that the construction item is not within a tolerance value identified using the specification; and
program instructions to link an exception block corresponding to the event with the construction item block in the blockchain, wherein the exception block includes an exception that causes another system to take corrective action to prevent use of the construction item in the construction project.

12. The computer usable program product of claim 11, further comprising:
program instructions to compute a likelihood of compliance, of data included in the data item block, with a second specification in a second spec block in the blockchain, wherein the data is captured in substantially real-time, wherein the likelihood of compliance is further dependent upon a circumstantial factor existing at a time when the data was captured; and
program instructions to link with the construction item block in the blockchain, and responsive to the data being non-compliant, a second exception block corresponding to the data; and
program instructions to cause a corrective action to occur in the construction project relative to the construction item in substantially real-time.

13. The computer usable program product of claim 11, wherein each block in the blockchain includes an identifier and wherein the identifier is unique within the blockchain.

14. The computer usable program product of claim 11, wherein data included in the data item block is captured from a source of a construction material that is used in the construction item.

15. The computer usable program product of claim 11, further comprising:
program instructions to capture data from a sensor monitoring the construction project, wherein the data item block comprises the data captured from the sensor; and
program instructions to analyze the data to identify the construction item in the construction project, wherein the construction item block comprises a description of the construction item, and wherein the linking is responsive to the program instructions to analyze.

16. The computer usable program product of claim 15, wherein the data is image data, wherein the sensor is a camera device, wherein the analyzing comprises image analysis to extract an image component, and wherein the image component is indicative of the construction item.

17. The computer usable program product of claim 11, further comprising:
program instructions to capture data from a sensor monitoring the construction project, wherein the data item block comprises the data captured from the sensor, and wherein the data comprises a measurement of a material used in the construction project.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising a processor, a computer-readable memory, and a computer-readable storage device, and program instructions stored on the storage device for execution by the processor via the memory, the stored program instructions comprising:
program instructions to link a data item block to a construction item block in a blockchain representing a construction project, wherein the linking comprises using a cognitive analysis engine to identify a construction item from a data item in the data item block;
program instructions to construct a multi-dimensional tensor from a set of blocks in the blockchain, the set of blocks comprising the data item block, the construction item block, a block describing an operation relative to the construction item of the construction item block;
program instructions to forecast along a dimension of the tensor, an event of the dimension that is likely to occur relative to the construction item at a future time;
program instructions to determine a non-compliance of the event with a specification included in a spec block of the blockchain, wherein the determining comprises detecting, using the cognitive analysis engine, that a content of the data item block indicates that the construction item is not within a tolerance value identified using the specification; and program instructions to link an exception block corresponding to the event with the construction item block in the blockchain, wherein the exception block includes an exception that causes another system to take corrective action to prevent use of the construction item in the construction project.

21. The computer system of claim 20, further comprising:
program instructions to compute a likelihood of compliance, of data included in the data item block, with a second specification in a second spec block in the blockchain, wherein the data is captured in substantially real-time, wherein the likelihood of compliance is further dependent upon a circumstantial factor existing at a time when the data was captured; and
program instructions to link with the construction item block in the blockchain, and responsive to the data being non-compliant, a second exception block corresponding to the data; and
program instructions to cause a corrective action to occur in the construction project relative to the construction item in substantially real-time.

22. The computer system of claim 20, wherein each block in the blockchain includes an identifier and wherein the identifier is unique within the blockchain.

23. The computer system of claim 20, wherein data included in the data item block is captured from a source of a construction material that is used in the construction item.

24. An apparatus comprising:
a data processing system operating a blockchain management system, the blockchain management system managing a blockchain representing a construction project, wherein the data processing system comprises a cognitive analysis engine operable to identify a construction item from a data item in a data item block in the blockchain and link the data item block to a construction item block in the blockchain;
a processor constructing a multi-dimensional tensor from a set of blocks in the blockchain, the set of blocks comprising the data item block, the construction item block, a block describing an operation relative to the construction item of the construction item block;
a forecasting engine forecasting, along a dimension of the tensor, an event of the dimension that is likely to occur relative to the construction item at a future time;
the processor determining a non-compliance of the event with a specification included in a spec block of the blockchain, wherein the determining comprises detecting, using the cognitive analysis engine, that a content of the data item block indicates that the construction item is not within a tolerance value identified using the specification; and
the data processing system linking an exception block corresponding to the event with the construction item block in the blockchain, wherein the exception block includes an exception that causes another system to take corrective action to prevent use of the construction item in the construction project.

25. A blockchain management system comprising:
a blockchain representing a construction project;
a cognitive analysis engine operable to identify a construction item from a data item in a data item block in the blockchain and link the data item block in the blockchain to a construction item block in the blockchain;
a forecasting engine forecasting, along a dimension of a multi-dimensional tensor, an event of the dimension that is likely to occur relative to the construction item at a future time, the tensor being constructed from a set of blocks in the blockchain, the set of blocks comprising the data item block, the construction item block, a block describing an operation relative to the construction item of the construction item block; and
a processor determining a non-compliance of the event with a specification included in a spec block of the blockchain, wherein the determining comprises detecting, using the cognitive analysis engine, that a content of the data item block indicates that the construction item is not within a tolerance value identified using the specification,
wherein the blockchain management system links an exception block corresponding to the event with the construction item block in the blockchain,
wherein the exception block includes an exception that causes another system to take corrective action to prevent use of the construction item in the construction project.

* * * * *